(12) United States Patent
Persson

(10) Patent No.: US 8,208,398 B2
(45) Date of Patent: Jun. 26, 2012

(54) ARRANGEMENT FOR A RADIO NETWORK AND A METHOD FOR GRANTING DATA RATES TO USERS IN A RADIO NETWORK

(75) Inventor: Mans Persson, Skogas (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 295 days.

(21) Appl. No.: 12/601,967

(22) PCT Filed: Jun. 19, 2007

(86) PCT No.: PCT/SE2007/050432

§ 371 (c)(1),
(2), (4) Date: Nov. 25, 2009

(87) PCT Pub. No.: WO2008/156394

PCT Pub. Date: Dec. 24, 2008

(65) Prior Publication Data

US 2010/0208600 A1     Aug. 19, 2010

(51) Int. Cl.
*H04L 12/26* (2006.01)
(52) U.S. Cl. ....................... 370/252; 370/328
(58) Field of Classification Search .......... 370/328–339; 455/436–444
See application file for complete search history.

(56) References Cited

U.S. PATENT DOCUMENTS

| | | | | |
|---|---|---|---|---|
| 6,069,883 | A * | 5/2000 | Ejzak et al. | 370/335 |
| 6,985,739 | B2 * | 1/2006 | Spaling et al. | 455/453 |
| 2004/0166900 | A1 * | 8/2004 | Qiu et al. | 455/560 |

FOREIGN PATENT DOCUMENTS

| | | |
|---|---|---|
| EP | 0767548 A2 | 4/1997 |
| EP | 1161112 A1 | 12/2001 |
| WO | 9526593 A2 | 10/1995 |
| WO | 0014900 A1 | 3/2000 |

OTHER PUBLICATIONS

Kumar, S., et al., "High Data-Rate Packet Communications for Cellular Networks Using CDMA: Algorithms and Performance", IEEE Journal on Selected Areas in Communications, vol. 17, No. 3, Mar. 1999, pp. 472-492.

* cited by examiner

*Primary Examiner* — Frank Duong
(74) *Attorney, Agent, or Firm* — Rothwell, Figg, Ernst & Manbeck, P.C.

(57) ABSTRACT

The present invention relates to an arrangement (202) for granting data rates to users in a radio network comprising a scheduler (207) arranged to grant data rates to users present within a cell of said radio network. The arrangement comprises a unit arranged to determine whether at least one new user in the cell originates from an adjacent cell, and an interference determination unit (209). The interference determination unit is arranged to provide a measure of a total interference level within the cell and to determine a relation between a set maximum interference value and the measured total interference level. The determination comprises adjusting the relation between the set maximum interference value and the measured total interference level if the origin determination unit has determined that the new user originates from an adjacent cell. The scheduler (207) is arranged to grant data rate to the at least one new user based on the determined relation between the set maximum interference value and the measured total interference level.

20 Claims, 3 Drawing Sheets

ARRANGEMENT FOR A RADIO NETWORK AND A METHOD FOR GRANTING DATA RATES TO USERS IN A RADIO NETWORK

CROSS REFERENCE TO RELATED APPLICATION

This application is a 35 U.S.C. §371 National Phase Application from PCT/SE2007/050432, filed Jun. 19, 2007, and designating the United States, which published as international publication number WO 2008/156394 A1, which publication is incorporated herein by reference.

TECHNICAL FIELD

The present invention relates to an arrangement for a radio network. More particularly, the invention relates to granting of data rates to mobile users in a cell of said radio network.

The present invention further relates to a method for granting data rates to users in a radio network.

BACKGROUND

Methods for handling increased and adaptive uplink bitrates are investigated in third generation partnership project (3GPP). Either the Node-B (base station) or the Radio Network Controller (RNC) is in accordance therewith arranged to schedule or assign uplink resources (physical channels) to users. The base station or Radio Network Controller is in accordance therewith provided with a scheduler arranged to grant data rates to users present within a cell associated to said base station. Conventionally, users (mobile stations) present within the cell associated to the base station communicate data with a fixed bit rate. However, with the so called enhanced uplink (also called HSUPA, High Speed Uplink Packet Access) having increased and adaptive bitrates, users are able to communicate data with a data rate determined by the scheduler. The scheduler is arranged to take into account interferences from other users in granting data rates to each user. One problem in the above mentioned scheduler is to determine the interferences from the other users so as to enable an adequate assignment of data rates to new users.

SUMMARY

One object of the present invention is to provide a way of determining interferences within a cell so as to enable controlled granting of data rates within a cell.

This has in one example been achieved by means of an arrangement for granting data rates to users in a radio network comprising a scheduler arranged to grant data rates to users present within a cell of said radio network. The arrangement is characterized in that it comprises a unit arranged to determine whether at least one new user in the cell originates from an adjacent cell, and an interference determination unit arranged to provide a measure of a total interference level within the cell. The total interference level is a sum of a first interference part related to interference from users within the cell and a second interference part related to interference from users outside the cell. The interference determination unit is further arranged to determine a relation between a set maximum interference value and the measured total interference level. The determination comprises adjusting the relation between the set maximum interference value and the measured total interference level if the origin determination unit has determined that the new user originates from an adjacent cell. The scheduler is arranged to grant data rate to the at least one new user based on the determined relation between the set maximum interference value and the measured total interference level.

The radio links used in one cell for communication between the mobile stations and the radio base station influences the interference in neighbouring cells. Accordingly, each cell is associated to a radio base station. In one example, at least the scheduler of the arrangement is incorporated in the radio base station. The arrangement provides an accurate way of calculating the influences from radio links from other cells in one cell. The calculation of influences from radio links from other cells is provided even though characteristically the first and second interference parts are determined with different time constants. The second time constant is characteristically greater than the first time constant.

One advantage of the arrangement in accordance with the above is that the continuity in data rate of users is improved when the user moves between cells in a radio network. Further, the influence from a radio link on other users in the network is controlled.

In accordance with one embodiment of the invention, the origin determination unit is arranged to receive information from a Radio Access Network Node related to movements of the new user and to determine so called soft handover from an adjacent cell based on said information. In one example, the origin determination unit is arranged to evaluate a Multiple Radio Link Set indicator value signalled from the Radio Access Network Node so as to determine soft handover. The origin determination unit can also be arranged to determine whether the new user originates from another cell handled by said base station, so called softer handover.

In accordance with one embodiment of the present invention, the interference determination unit is arranged to reduce the second interference part with a load factor associated to each new user in the cell originating from an adjacent cell. In an opposite case, wherein it is detected that a user of the cell moves to an adjacent cell, the second interference part is in accordance with one embodiment of the present invention arranged to be increased with a load factor associated to the user moving to the adjacent cell.

The present invention also relates to a method for granting data rates in a radio network. The method comprises the steps of providing a measure of a total interference level within a cell, and granting (706) data rates to users present within the cell based on a relation between a set allowed maximum interference value and the measured total interference level. The method is characterized in that it comprises a step of determining whether at least one new user originates from an adjacent cell, and in that the step of granting data rates to users comprises adjusting the relation between the set maximum interference value and the measured total interference level if it has been determined that the new user originates from an adjacent cell.

DETAILED DESCRIPTION

Figure 1:
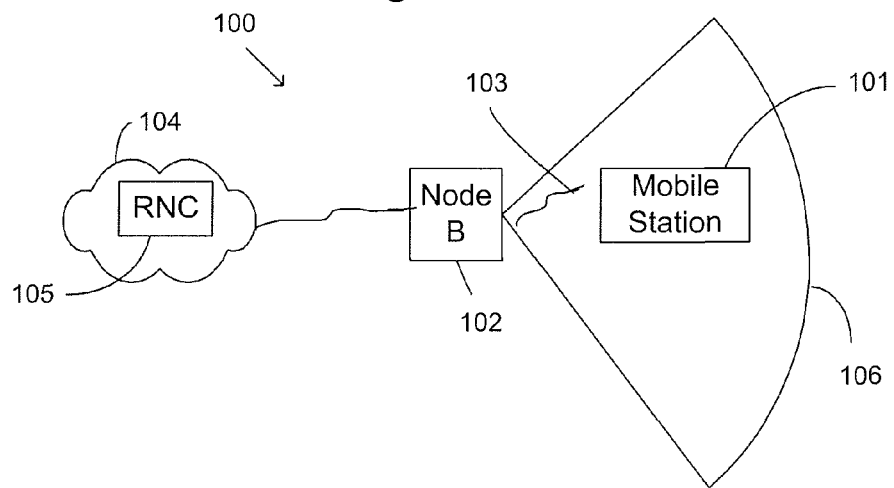
FIG. 1 schematically illustrates a radio communication system.

FIG. 1 schematically illustrates a mobile radio communication system 100, in which a mobile station 101 can communicate with a radio base station 102 over a radio link 103. The radio base station is connected to an access network 104. In this description, the only part related to in the access network 104 is a Radio Access Network Node or Radio Network Controller (RNC) 105 serving the base station. The Radio Access Network Node is in one example a Radio Network Controller (RNC). Accordingly, only said radio network controller 105 of the core network 104 is illustrated in the figure. A geographical area served by the radio base station 102 is referred to as a cell 106.

The radio link 103 can typically be used for voice calls, as well as for data transfer sessions. At least radio links for data transfer can have a settable data rate. In accordance therewith, the radio base station is arranged to grant data rates at least for the uplink transmission path from the mobile station to the base station. The procedure for grant of data rates will be discussed in detail below. A radio uplink with a settable data rate is herein denoted as an enhanced radio uplink. The settable data rate is in one example a bit rate. The bit rate is in one example within a range up to 2 Mbit/s. In another example, the settable bit rate is within a range up to 5 Mbit/s. In yet another example, the settable bit rate is within a range up to 10 Mbit/s. In practice, the radio base station can be arranged to grant another quantity related to the data rate, such as power. In this description the term bandwidth will be used as the granted quantity, although the actual quantity will be dependent on access technology. For WCDMA, the quantity is power, which is related to data rate.

Figure 2:
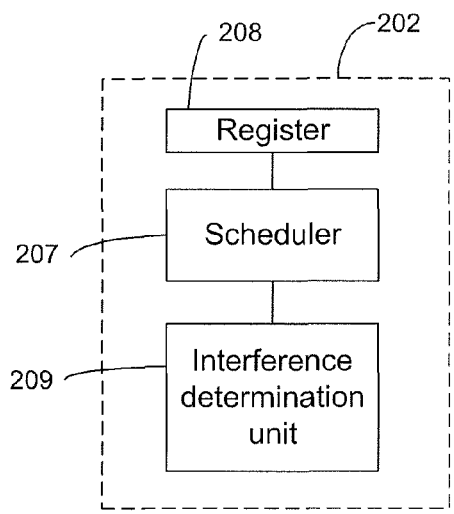
FIG. 2 shows a block scheme over an example of a radio base station in the mobile communication system in FIG. 1.

In FIG. 2, a radio base station 202 comprises a scheduler 207, a register 208, and an interference determination unit 209. The scheduler 207 is arranged to grant bandwidths to users for uplink communication. The register 208 comprises among other information, information related to an upper interference limit in the cell 106 handled by the scheduler 207. The upper interference limit is in one example preset by an operator of the mobile radio communication system. The scheduler 207 is arranged to receive information that a new mobile station 101 (user) has called the radio base station 202 along with an identity of the new mobile station. Upon reception of such information, the scheduler 207 is arranged to feed an inquiry to the interference determination unit 209 about available power or bandwidth. The interference determination unit 209 is arranged to deliver a response indicating available power or bandwidth. The scheduler 207 is then arranged to grant power or data rate to the new mobile station 101 based on a relation between the available power/bandwidth indicated by the interference determination unit 209 and the upper interference limit information from the register 208.

Figure 3:
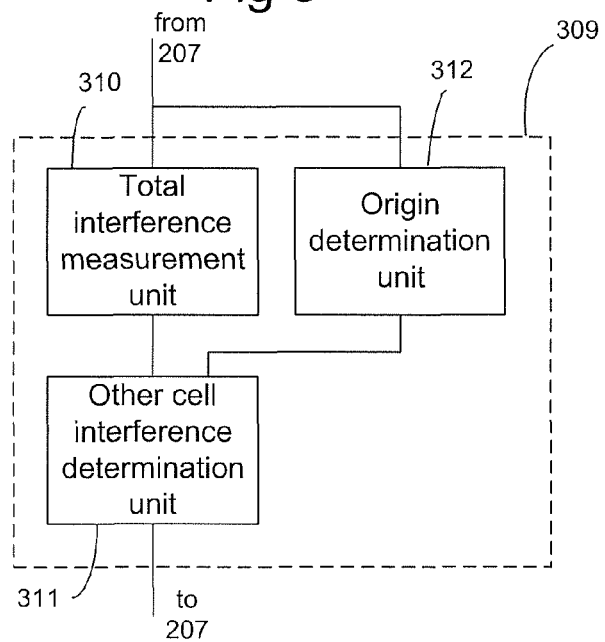
FIG. 3 shows a block scheme over an example of an interference determination unit in the radio base station in FIG. 2.

In FIG. 3, an interference determination unit 309 is arranged to receive the inquiry about available power/bandwidth. The inquiry includes the identity of the new mobile station. The interference determination unit 309 comprises a total interference measurement unit 310, an interference from other cells determination unit 311 and an origin determination unit 312. The total interference measurement unit 310 is arranged to measure interferences experienced by the radio base station 202.

In one example, the total interference measurement unit 310 is arranged to measure a Rise Over Thermal noise (RoT) value. The Rise Over Thermal noise value indicates the ratio between the total power received from wireless sources at the base station and the thermal noise power. The thermal noise measurement is for example performed by way of scanning a frequency band used by the radio base station. The thermal noise measurement is updated with a low frequency, for example every two seconds or every minute. The total power received from wireless sources at the base station is for example measured every time the scheduler is in use. Accordingly, the measurement of the total power received from wireless sources is characteristically updated more frequently than the measurement of the thermal noise. However, at least the measured total power received from wireless sources is low pass filtered. Accordingly, the obtained Rise Over Thermal value or another value providing a measure of the total interference level is dependent on previous values. Thus, the Rise Over Thermal value or another value providing a measure of the total interference level is related to a predetermined time constant.

The obtained measured Rise Over Thermal value or another value providing a measure of the total interference level is then used as a measure of the total interference in the cell experienced by the radio base station 202. The total interference value thus includes interferences from other, adjacent cells and from all mobile stations within the cell handled by the base station 202. The total interference measurement unit 310 is connected to the other cell interference determination unit 311 arranged to determine a value of the interference from other cells. In order to determine said value, the other cell interference determination unit 311 is in one example arranged to use information provided by the scheduler 207 regarding all granted data rates to active mobile stations within the cell. In this example, the other cell interference unit 311 is arranged to calculate a sum of all granted data rates. That sum is an adequate measure of the interference experienced by the radio base station from mobile stations within the cell 106. The other cell interference determination unit 311 is then arranged to determine the difference between the total interference value determined by the total interference measurement unit 310 and the determined sum of all granted data rates so as to provide an estimate of the interference from other cells. The measure of the interference experienced by the radio base station from mobile stations within the cell 106 is determined without any or at least small regard to previous measurements. Accordingly, the time constant for the determination of the interference experienced by the radio base station from mobile stations within the cell is characteristically shorter than the time constant for the total interference level. Thus, the time constant for the determination of the interference experienced by the radio base station from mobile stations within the cell in characteristically shorter than the time constant for the estimate of the interference from other cells. The longer time constant for the estimate of the interference from other cells is among other things provided in order to keep a balance between the cells regarding the level of the interferences from other cells. This will not be discussed in detail herein; it is only established that the time constant for the estimate of the interference from other cells is longer than the time constant for the interference experienced by the radio base station from mobile stations within the cell.

Further, the identity of the new mobile station 101 is fed to the origin determination unit 312. The origin determination unit 312 is arranged to determine if the new mobile station 101 originates from an adjacent cell and has moved to the current cell 106 or if the new mobile station 101 started its session within the current cell 106. If it is determined that the mobile station 101 originates from an adjacent cell, the origin determination unit 312 is then arranged to feed that information to the other cell interference determination unit 311. The other cell interference determination unit 311 is then arranged to adjust the determined interference from other cells in accordance therewith so as to remove the influence from that mobile station 101 on the other cell interference estimate. Typically, the base station 102 has knowledge of the used data rate of the new user. The adjustment is in one example made in accordance with the data rate used by the new mobile station. The adjustment value is hereinafter denoted as a load factor. The interference determination unit 309 is in one example arranged to deliver a value of the interference from other cells and the interference from the own cell to the scheduler 207. The interference determination unit 309 is in another example arranged to deliver a value of the interference from other cells and the total interference to the scheduler 207.

Figure 4:
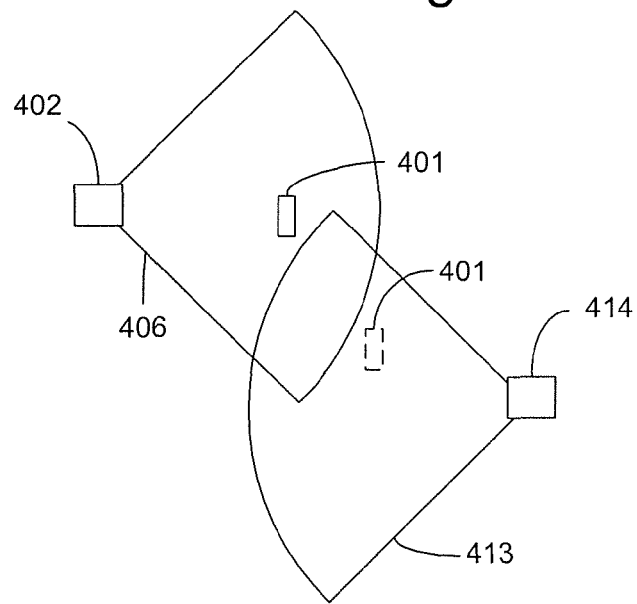
FIG. 4 schematically illustrates soft handover in a radio communication system.

In one example, the origin determination unit 312 is arranged to receive information from a Radio Access Network Node 105 related to movements of the new user 101. If the information from the Radio Access Network Node (RNC) indicates that the mobile station originates from an adjacent cell handled by another base station, the origin determination unit 312 returns a message to the other cell interference determination unit 311 that a load factor should be removed from the other cell interference estimate. A hand-over of a mobile station in this manner is often referred to as soft hand-over. In one example, the information from the Radio Access Network Node is a Multiple Radio Link Set indicator value. FIG. 4 illustrates an example, wherein the new mobile station 401 originates from an adjacent cell 413 handled by another base station 414.

Figure 5:
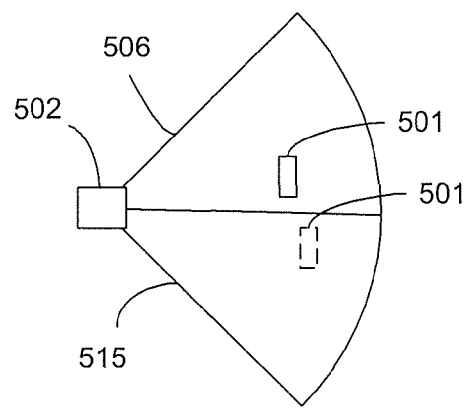
FIG. 5 schematically illustrates softer handover in a radio communication system.

In another example, the origin determination unit 312 is arranged to either receive information from the Radio Access Network Node 105 or the base station itself 102, related to movements of the new user 101. If the information from the Radio Access Network Node 105 or the base station 102 indicates that the mobile station originates from an adjacent cell handled by the base station 102 itself, the origin determination unit 312 is arranged to return a message to the other cell interference determination unit that the load factor for that mobile station 101 should be removed from the other cell interference estimate. A hand-over of a mobile station in this manner between cells handled by the same base station, is often referred to as softer hand-over. FIG. 5 illustrates an example, wherein the new mobile station 501 originates from an adjacent 515 cell handled by the same mobile station 101.

The origin determination unit 312 is in one example arranged to determine both soft handover and softer handover.

In one example, the Radio Access Network Node is arranged to feed identities to the origin determination unit 312 of mobile stations, which originate from adjacent cells and have entered the present cell 106. The origin determination unit 312 is then arranged to compare the identity received from the scheduler 209 to the identities received from the Radio Access Network Node. If the comparison indicates a match, the origin determination unit is arranged to return a message to the other cell interference determination unit indicating that the load factor for that mobile station 101 should be removed from the other cell interference estimate.

Figure 6:
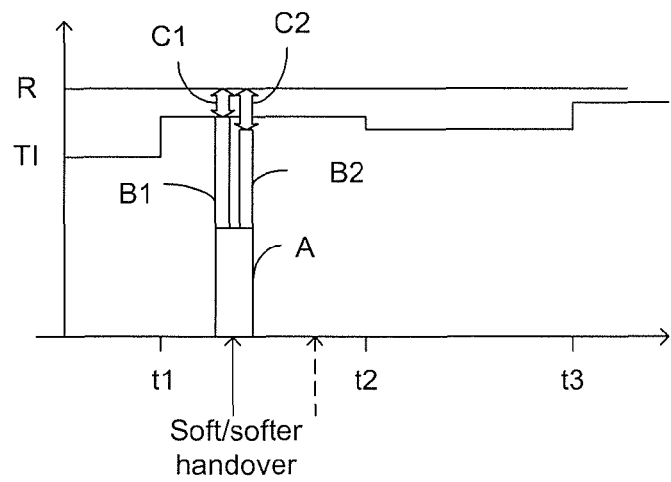
FIG. 6 shows a graph schematically illustrating measured and calculated interferences within a cell in the radio communication system in FIG. 1.

In FIG. 6, R represents the upper interference limit stored in the register 208. T1 shows the total interference values measured by the total interference measurement unit 310. The measurements are updated at times t1, t2 and t3. A continuous arrow in the figure between the times t1 and t2 represents a time for a soft or softer handover of a mobile station. A represents a determined level of the interferences from other users within the cell. The level of A is provided by calculating a sum of all data rates granted by the scheduler 207 to active mobile stations within the cell, as discussed above. B1 represents the interference from other cells determined without removing the load factor for the new soft/softer handover user. C1 indicates the power available to the scheduler 207 for granting data rates to the new user 101 without a compensation for the load factor for the new soft/softer handover user. B2 represents the interference from other cells, wherein the load factor has been removed. C2 indicates the bandwidth available to the scheduler 207 for granting bandwidth to the new user 101 with a compensation for the load factor for the new soft/softer handover user.

If a new soft or softer handover is carried out (at the broken arrow) later within the time interval between the times t1 and t2, the interference from other cells is determined by removing the load factors from both the preceding soft/softer handover and the current soft/softer handover. To generalize, the sum of load factors for all soft/softer handovers within the time interval between two total interference measurements should be reduced from the other cell interference estimate.

In one example, the interference determination unit 209 is also arranged to detect soft/softer handover of a mobile station from said cell 106 to an adjacent cell. When the base station 102 is not any longer having a radio link for that mobile station, said mobile station with its associated bandwidth is removed from the scheduler 207. In one example, the other cell interference determination unit 311 is then arranged to add the load factor associated to that mobile station to the other cell interference estimate if the radio link connection ceased due to soft or softer handover. The addition of the load factor is kept until the total interference measurement unit 310 performs a new measurement.

The description above describes an example, wherein the register, 208, scheduler 207 and the interference determination unit 209 are incorporated in the base station 202. However, in another example (not shown), at least the register 208 and/or parts of the interference determination unit 209 are placed in another part of the radio network, for example the Radio Access Network Node 105. The base station can in accordance therewith be arranged to perform measurements so as to provide raw data and the Radio Access Network Node can be arranged to determine the available power/data rate. The grant of data rate can be performed by the base station.

Figure 7:
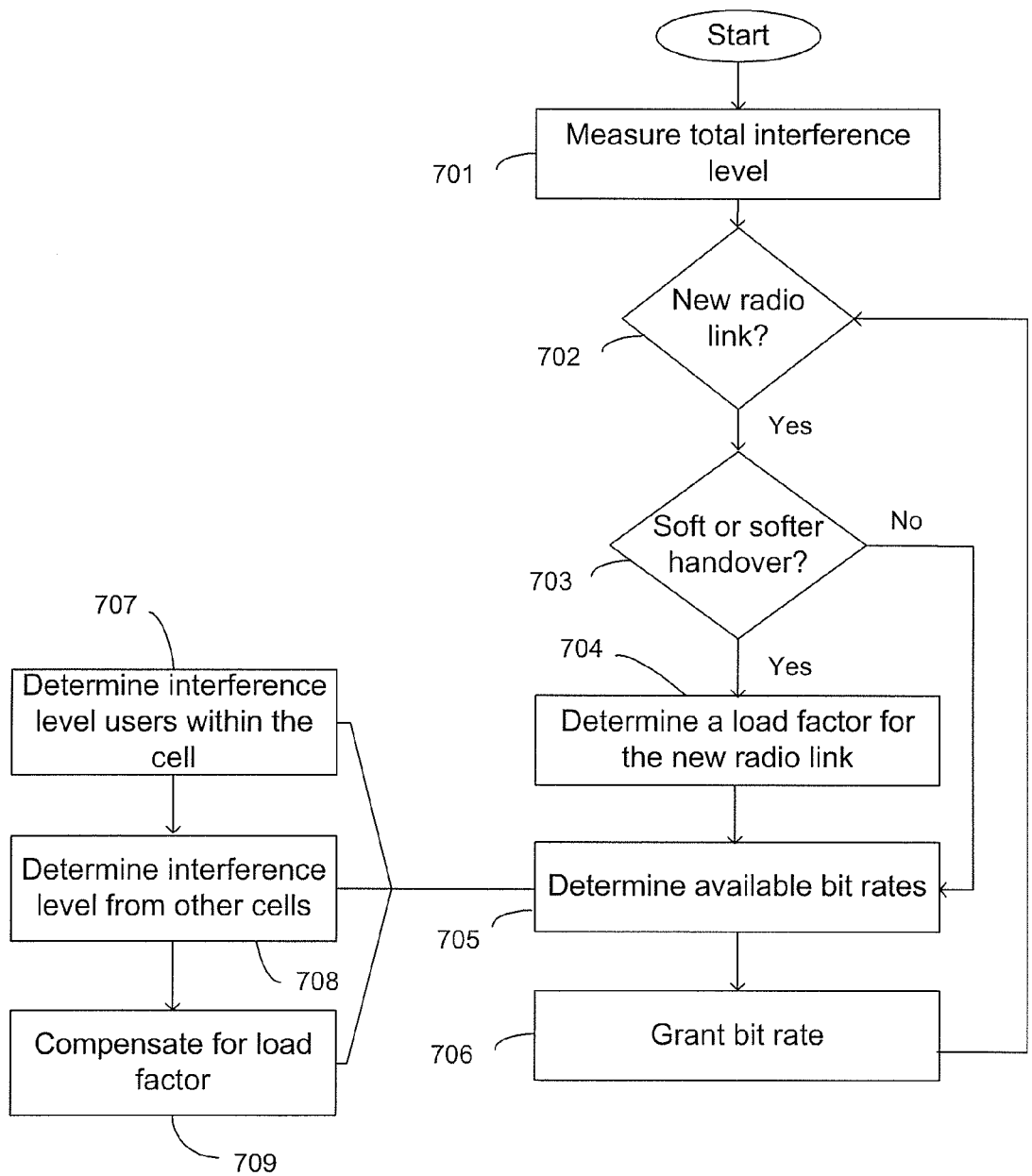
FIG. 7 is a flow chart showing an example of a procedure for granting bandwidths within a radio communication system.

In FIG. 7, a method for granting data rates in a radio network comprises the steps of providing 701 a measure of a total interference level within a cell possibly with predetermined time intervals, determining 702 if a new user has appeared within the cell, and determining 703 whether the new user originates from an adjacent cell. In one example, the step of determining 703 whether at least one new user originates from an adjacent cell comprises evaluating a Multiple Radio Link Set indicator value signalled from the Radio network Controller so as to determine soft handover from an adjacent cell If the new user originates from an adjacent cell, a load factor is calculated 704 and an available power or data rate is determined 705 in view of the determined load factor. Finally, data rate to the new user is granted 706 based on the available power/data rates. The step of determining 705 available power/data rates to the user comprises in one example adjusting a relation between a set maximum interference value and the measured total interference level if it has been determined that the new user originates from an adjacent cell.

In one example, the determination 705 of available power/data rate comprises the steps of determining 707 an interference level for users within the cell, and to determine 708 an interference level for users from adjacent cells based on a relation between the total interference level and the determined interference level for users within the cell. Finally, the determined interference level from other cells is adjusted 709 based on the load factor.

In a situation wherein several new users have entered the cell from adjacent cells between measurements of the total interference level, the estimated interference level from users from adjacent cells is reduced with a load factor associated to each new user originating from an adjacent cell, and in that the adjusted total interference level is determined as a sum of the interference from users within the cell and the reduced interference level from users from other cells.

The invention claimed is:

1. An apparatus for granting data rates to users in a radio network, comprising:
   a scheduler arranged to grant data rates to users present within a first cell of said radio network;
   an origin determination unit arranged to determine whether a new user in the first cell originates from an cell that is adjacent to the first cell, and
   an interference determination unit arranged to (a) provide a measure of a total interference level within the cell, said total interference level being a sum of a first interference part related to interference from users within the cell and a second interference part related to interference from users outside the cell and (b) determine a first relation between a set maximum interference value and the measured total interference level, wherein
   the apparatus is configured such that, if the origin determination unit has determined that the new user originates from a cell adjacent to the first cell, then:
   (i) the interference determination unit adjusts the determined first relation to produce a second relation, and
   (ii) the scheduler grants data rate to the new user based on the second relation.

2. The apparatus according to claim 1, wherein at least the scheduler is arranged in a base station, and said cell is associated with the base station.

3. The apparatus according to claim 1, wherein the origin determination unit is arranged to receive information from a Radio Access Network Node related to movements of the new user and to determine so called soft handover from an adjacent cell based on said information.

4. The apparatus according to claim 3, wherein the origin determination unit is arranged to evaluate a Multiple Radio Link Set indicator value signalled from the Radio Access Network Node so as to determine soft handover.

5. The apparatus according to claim 2, wherein the origin determination unit is arranged to determine whether the new user originates from another cell associated with said base station.

6. The apparatus according to claim 1, wherein
   the interference determination unit is arranged to determine the first interference part with a first time constant and the second interference part with a second time constant, and
   said second time constant is greater than the first time constant.

7. The apparatus according to claim 6, wherein the interference determination unit is arranged to adjust the first relation by decreasing the first relation by a load factor associated with the new user.

8. The apparatus according to claim 1, wherein the interference determination unit is arranged to, upon detection that a user of the cell moves to an adjacent cell, increase the second interference part with a load factor associated with the user moving to the adjacent cell.

9. A method for granting data rates in a radio network comprising the steps of:
   providing a measure of a total interference level within a first cell of the radio network, and
   granting data rates to users present within the first cell based on a relation between a set maximum interference value and the measured total interference level, wherein the granting step comprises determining whether a new user within the first cell originates from an adjacent cell, and
   adjusting the relation between the set maximum interference value and the measured total interference level if it has been determined that the new user originates from an adjacent cell.

10. The method according to claim 9, wherein step of determining whether the new user originates from an adjacent cell comprises evaluating a Multiple Radio Link Set indicator value signalled from the Radio network Controller so as to determine soft handover from an adjacent cell.

11. The method according to claim 9, wherein the step of providing a measure of a total interference level within a cell comprises the steps of:
    determining an interference level for users within the cell with a first time constant, and
    determining an interference level for users from adjacent cells with a second time constant.

12. The method according to claim 11, wherein
    the interference level from users from adjacent cells is reduced with a load factor associated to each new user originating from an adjacent cell, and
    the adjusted total interference level is determined as a sum of the interference from users within the cell and the reduced interference level from users from other cells.

13. The method according to claim 9, wherein
    the step of determining whether the new user originates from an adjacent cell comprises determining all new users originating from other cells since a last update of the total interference level, and
    the step of granting data rates to users comprises adjusting a relation between the set maximum interference level and the measured total interference by adjusting the load factors with knowledge of users coming from or leaving to other cells.

14. The method according to claim 12, further comprising:
    detecting that a user in the first cell has moved to an adjacent cell, and
    increasing the interference level for users from adjacent cells with a load factor associated to the moved user upon detection that the user has moved to an adjacent cell.

15. In a radio network comprising a first cell served by a first base station and one or more other cells that are adjacent to the first cell and served by one or more other base stations, a method for determining an amount of a resource that is available within the first cell, the method comprising:

(a) determining a first value representing the total interference level within the first cell at a first point in time;

(b) after step (a), determining whether a new user within the first cell originated from one of the other cells that are adjacent to the first cell; and (c) in response to determining that the new user originated from a cell that is adjacent to the first cell, calculating a second value corresponding to the amount of the resource that is available within the first cell at a second point in time that is subsequent to the first point in time, wherein the calculating step comprises subtracting from the first value an adjustment value.

16. The method of claim 15, wherein the adjustment value is a load factor value associated with the new user.

17. The method of claim 15, further comprising using the second value to determine a data rate to grant to the new user.

18. The method of claim 16, further comprising:

(d) after step (c), determining whether a second new user within the first cell originated from one of the other cells that are adjacent to the first cell; and (e) in response to determining that the new user did not originate from a cell that is adjacent to the first cell, then using the first value to determine a data rate to grant to the second new user.

19. The method of claim 15, wherein the step of determining whether the new user originated from a cell adjacent to the first cell comprises receiving information from a Radio Access Network Node related to movements of the new user.

20. The method of claim 19, wherein the information from the Radio Access Network Node comprises a Multiple Radio Link Set indicator value.

* * * * *